United States Patent [19]
Barcza

[11] Patent Number: 5,364,029
[45] Date of Patent: Nov. 15, 1994

[54] AXISYMMETRIC CONVERGENT/DIVERGENT NOZZLE WITH EXTERNAL FLAPS

[75] Inventor: M. Kevin Barcza, Palm City, Fla.

[73] Assignee: United Technologies Corporation, Hartford, Conn.

[21] Appl. No.: 114,121

[22] Filed: Aug. 30, 1993

[51] Int. Cl.[5] .............................................. B64C 15/02
[52] U.S. Cl. ............................ 239/127.3; 239/265.17; 239/265.33; 239/265.41
[58] Field of Search ............. 239/127.1, 127.3, 265.17, 239/265.19, 265.33–265.41; 60/271

[56] References Cited

U.S. PATENT DOCUMENTS

| | | | |
|---|---|---|---|
| 3,467,312 | 9/1969 | Mehr | 239/265.41 |
| 4,043,509 | 8/1977 | McHugh et al. | 239/265.41 |
| 4,128,208 | 12/1978 | Ryan et al. | 239/265.39 |
| 4,203,286 | 5/1980 | Warburton | 239/265.39 |
| 4,544,098 | 10/1985 | Warburton | 239/127.3 |
| 4,591,097 | 5/1986 | Thayer | 239/265.41 |
| 5,039,014 | 8/1991 | Lippmeier | 239/265.39 |
| 5,082,182 | 1/1992 | Bruchez, Jr. et al. | 239/265.35 |
| 5,110,050 | 5/1992 | Nightingale | 239/265.39 |
| 5,111,992 | 5/1992 | Barcza | 239/127.3 |
| 5,120,005 | 6/1992 | Reedy | 239/265.41 |
| 5,150,839 | 9/1992 | Reedy | 239/265.41 |
| 5,176,323 | 1/1993 | Nash | 239/265.41 |

FOREIGN PATENT DOCUMENTS

| | | | |
|---|---|---|---|
| 1146703 | 4/1963 | Germany | 239/265.41 |
| 936044 | 9/1963 | United Kingdom | 239/265.41 |

Primary Examiner—Karen B. Merritt
Attorney, Agent, or Firm—Edward L. Kochey, Jr.

[57] ABSTRACT

The gas turbine engine nozzle has fifteen divergent flaps (18) secured to fifteen convergent flaps (14). Five external flaps (30), are each of a "V" shape, and surround the divergent flaps. The position of all flaps is adjustable (22) for varying the nozzle configuration. Arms (46,48) of the external flaps overlap, being parallel at the maximum overlap. The external flaps are slidably secured to the divergent flaps and move therewith.

29 Claims, 5 Drawing Sheets

AXISYMMETRIC CONVERGENT/DIVERGENT NOZZLE WITH EXTERNAL FLAPS

TECHNICAL FIELD

The invention relates to discharge nozzles for gas turbine engines and in particular to external flaps therefore.

Background of the Invention

Variable geometry exhaust ducts for aircraft gas turbine engines frequently used axisymmetric arrangement of adjacent flaps to define the periphery of the exhaust duct. Overlapping seal members operates to seal between the adjacent flaps. An intermediate transverse hinge in the flap and seal members between a convergent section and a divergent section provides the desired convergent/divergent arrangement. The duct may accordingly be configured to define a variable throat area and variable exit area which is necessary for optimum engine performance, particularly in high speed aircraft installations using after burning for thrust augmentation.

The convergent/divergent flaps guide the engine exhaust. It is usual to also supply exterior flaps on a one to one basis with the divergent flaps, located outboard of the nozzle surrounding the nozzle. This protects the internal mechanism of the nozzle and provides a smoother appearance. It also provides a proper aerodynamic exterior avoiding cracks or openings which could induce flow perturbations. It also provides an overall lower drag boattail.

A penalty is paid in the extra weight and additional parts required by these external flaps. It accordingly is desirable to minimize the number of interface cracks, or extra weight and the number of parts.

SUMMARY OF THE INVENTION

An axisymmetric nozzle with 15 convergent flaps and 15 divergent flaps is surrounded and protected by only 5 external flaps. The flaps are substantially of V shape with overlapping arms. When the overlap is at a maximum the arms are parallel minimizing any opening between the adjacent flaps. The peak of each V shape flap extends rearwardly beyond the aft end of the convergent flaps to reduce a dead spot exterior of the discharge flow, thereby reducing drag.

Each of the exterior flaps is pivotally secured to a static structure which supports the convergent/divergent nozzle, and is slidingly secured to the divergent flaps so that it pivots and moves there. The forward end of each external flap may be made arcuate in cross section with no linear arms when it is desirable to fair the external flaps into a round structure. The flaps may be used in conjunction with an ejector type divergent flap by providing cavity seals, sealingly extending from the static structure to the divergent flaps.

DESCRIPTION OF THE PREFERRED EMBODIMENT

Figure 1:
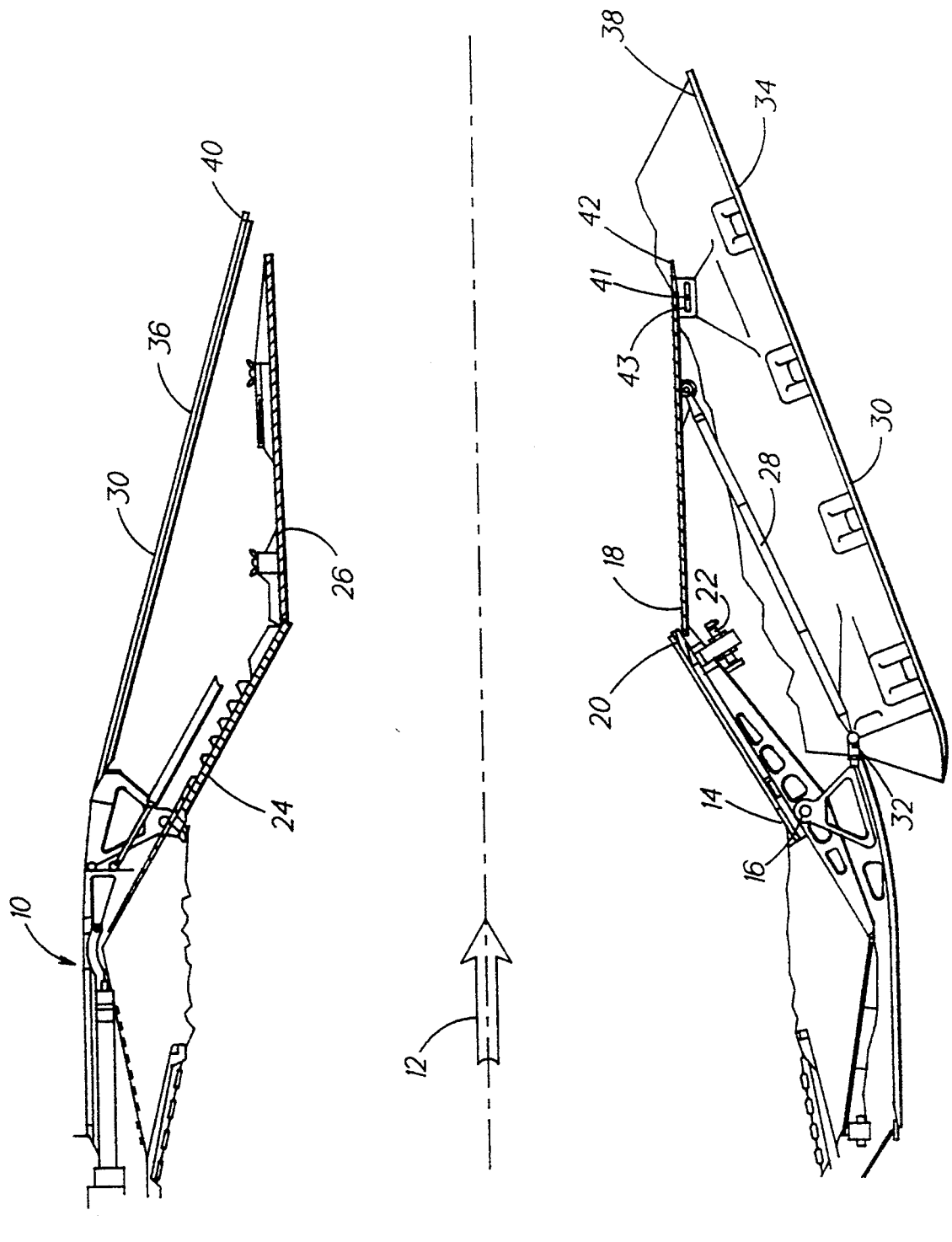
FIG. 1 is a side elevation through the nozzle.

In FIG. 1 there is shown a static structure 10 for the conveyance of turbine exhaust gases 12 therethrough. Fifteen convergent flaps 14 are pivotally secured at pivot 16 to the static structure. Fifteen divergent flaps 18 are pivotally secured at pivot 20 with their upstream end secured to the downstream end of the convergent flaps. An adjustment means in the form of a bell crank mechanism 22 operates to adjust the position of the convergent and divergent flaps, thereby dictating the throat and the exhaust openings of the nozzle.

Inboard of and intermediate adjacent convergent flaps 14 are convergent seals 24. Inboard of an intermediate adjacent divergent flaps 18 or divergent seals 26.

Mode strut 28 is connected to the static structure and a downstream portion of the divergent flap to establish location of the flap for various positions of the convergent flaps.

Surrounding the fifteen convergent flaps of the nozzle are five external flaps 30. Each is pivotally secured to the static structure at pivot point 32. The external flaps of each are a "V" shape with the peak 34 being shown in the lower portion of FIG. 1, while a section through the arms 36 of the flap are shown in the top half of the FIG. 1. It is also noted that the aft end 38 of the peak 34 extends aft of the end 40 of the arms of the flap as well as the aft end 42 of the divergent flaps.

The external flaps move with the divergent flaps positions by an aft end sliding connection. Pin 41 of the external flap fits and slides within axially elongated slot 43 of the divergent flap for this purpose.

Figure 2:
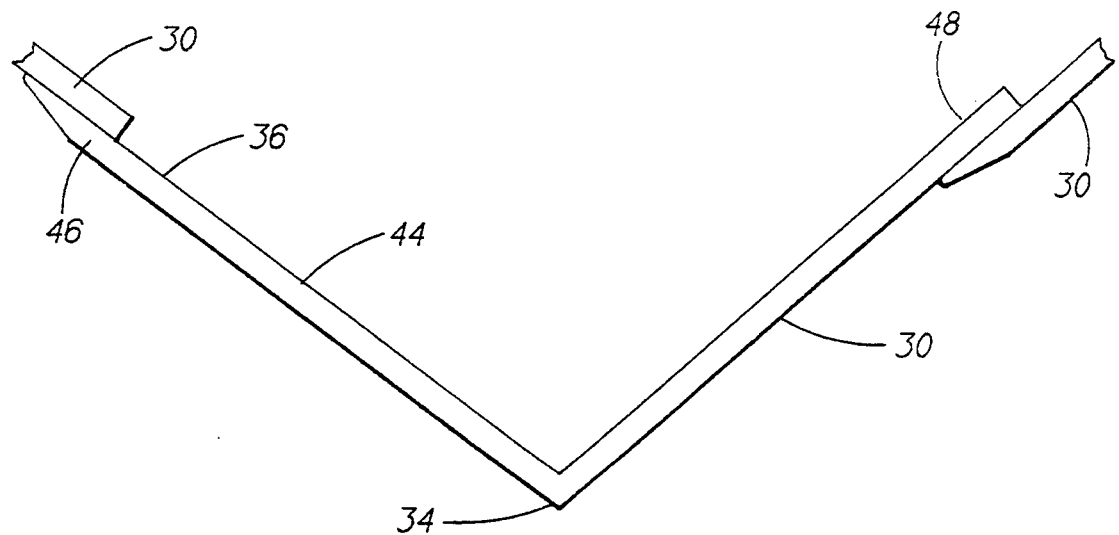
FIG. 2 is a section through an external flap.

FIG. 2 illustrates the general overlapping arrangement of the external flaps 30. It can be seen that of the flap 44, the arm 46 overlaps outboard of the adjacent flap 30, while the other arm 48 overlaps inboard of the other adjacent flap 30.

Figure 3A:
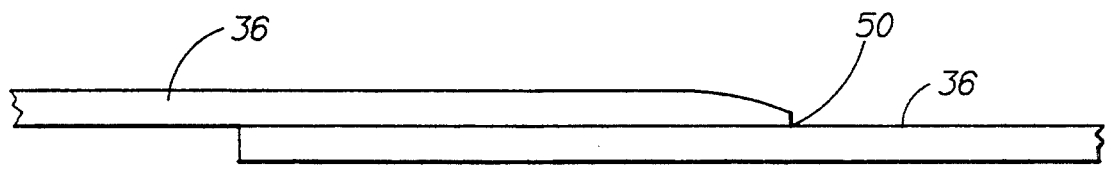
FIGS. 3a, b and c are sections showing the overlap at various positions.
Figure 3B:
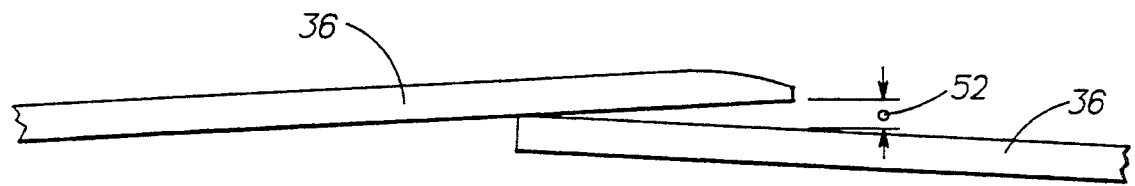
Figure 3C:
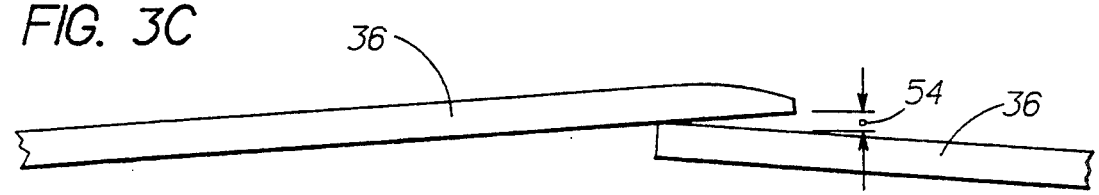

While the arms of the flap can be parallel to each other in one position they cannot maintain this parallel relationship as the external flap pivots around the pivot 32. Accordingly as shown in FIG. 3a the arms 36 are parallel at the maximum overlap position, there being then substantially no crack 50 to perturbate the flow. At an intermediate position illustrated at FIG. 3b the flaps are not parallel and an opening 52 develops being relatively small because of the limited overlap and almost parallel relationship. In the minimum overlap position illustrated in FIG. 3c the lack of parallelarity is most extreme. However because of the very small overlap the opening 54 is still quite small resulting in low flow perturbation.

Figure 4:
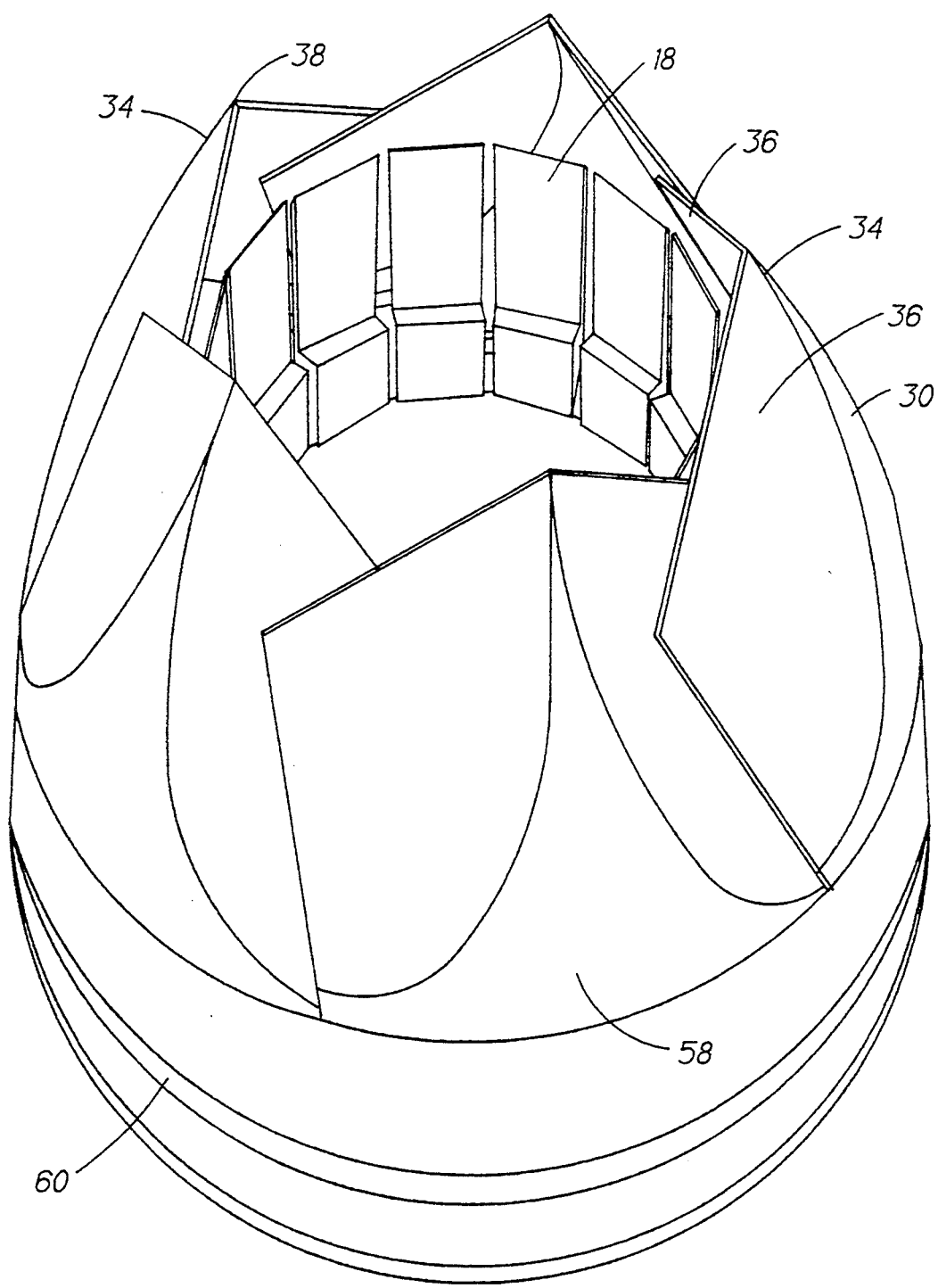
FIG. 4 is an isometric view with the forward end of the external flaps arcuate.
Figure 5:
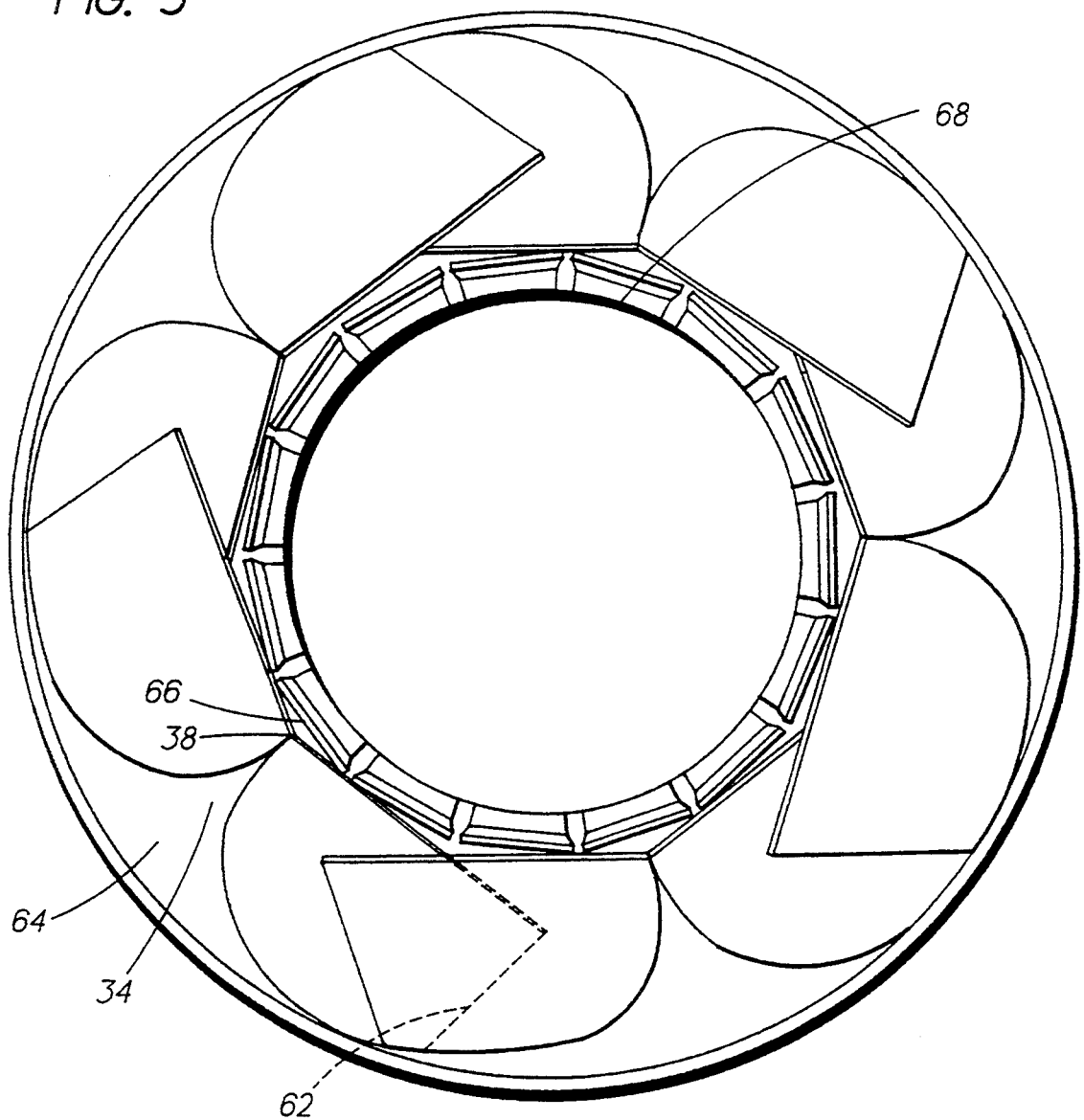
FIG. 5 is a rear view with a forward end of the external end arcuate.

FIG. 4 is an isometric view of the nozzle with divergent flaps 18 shown but with divergent seals 26 removed. The external flaps 30 are modified so that the upstream end 58 is arcuate in form with no straight arms. This facilitates fairing the external nozzles into the air frame structure 60. FIG. 5 is a rear view of the nozzle. The dash line 62 of external flap 64 shows the manner in which the flap underlies the adjacent flap.

Extension of the peak 34 to location 38 well aft of the nozzle reduces the dead space 66 to a small area. Therefore there is reduced drag on the flow passing out through the flow area 68 of the nozzle.

Figure 6:
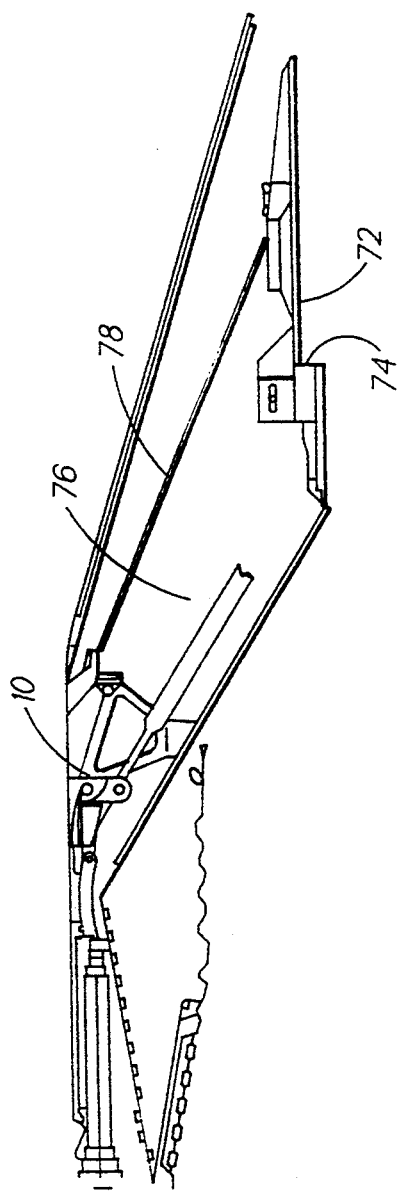
FIG. 6 is a side elevation with an ejector slot in the divergent flap and with the forward end of the external flaps arcuate.
Figure 6:
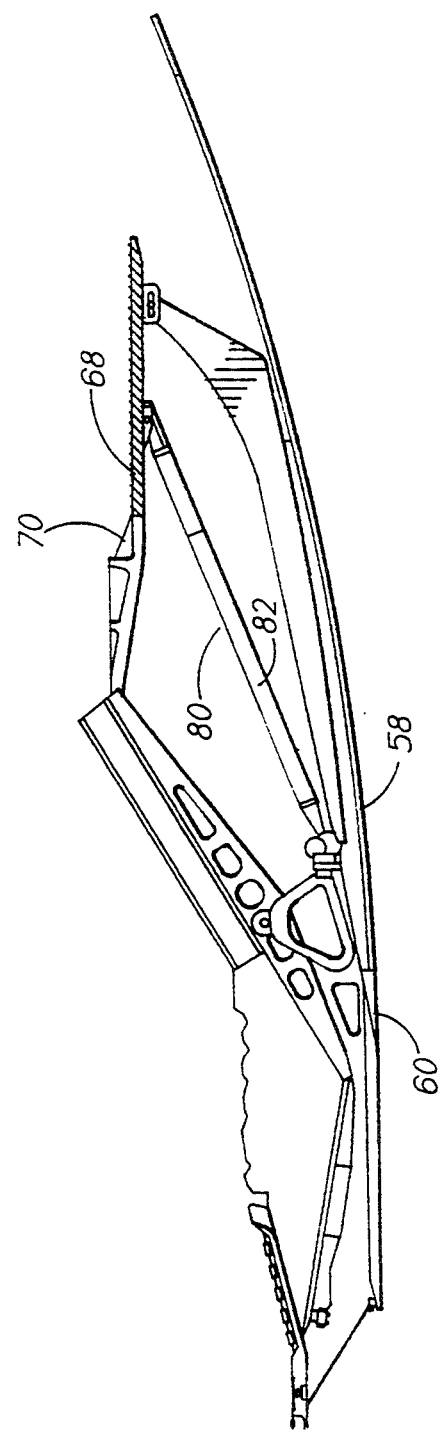

FIG. 6 is a side elevation where the forward end of the external flap has the arcuate portion 58 fairing in with the airframe 60. The divergent flap 68 here has an ejector slot 70 for the introduction of cooling air while the divergent seal 72 in a similar manner has an injection slot 74. Cooling air may be supplied by ram air to chamber 76 within which it is contained by cavity seals 78 sealing between the static structure 10 and the seal 72. Cavity seals are also located at 80 on the mode struts 82. This cavity seal 80 passes between the static structure 10 and the divergent flap 68. Accordingly the external flaps may be used (even though they are not gas tight) along with the ejector flaps by using the cavity seals.

In the specific embodiment described there are fifteen divergent flaps and five external flaps. Broadly, the number of convergent flaps (N) must be an even multiple (X) of the external flaps. This multiple may be 2 or 3. Thus twelve convergent flaps could be used with six external flaps, or eighteen convergent flaps with either six or nine external flaps.

I claim:

1. An axisymmetric convergent/divergent nozzle for a gas turbine engine comprising:
   a static structure for the conveyance of exhaust gas therethrough;
   a plurality of N convergent flaps circumferentially disposed adjacent one another, aft of said static structure and pivotally secured to said static structure;
   a plurality of N divergent flaps, each secured at the forward end to the aft end of a convergent flap;
   adjustment means for adjusting position of said divergent flaps; and
   a plurality of N/X external flaps in overlapping relationship with adjacent external flaps where X is equal to one of 2 or 3, and located outboard of said divergent flaps, each pivotally secured at the forward end of the said static structure and slidably secured to a divergent flap at the aft end.

2. An axisymmetric nozzle as in claim 1, wherein:
   each external flap has a cross section of substantially a "V" shape with two linear arms, the arms of adjacent flaps overlapping.

3. An axisymmetric nozzle as in claim 2, further comprising:
   the forward end of each external flap arcuate in cross section with no linear arms.

4. An axisymmetric nozzle as in claim 3, wherein:
   the longitudinally extending center of each of said "V" shaped external flaps comprises a peak; and
   said peak extends aft of the remainder of said external flap and aft of the aft end of said divergent flap.

5. An axisymmetric nozzle as in claim 4, further comprising:
   one arm of each external flap overlapping outboard of the adjacent flap and one arm overlapping inboard of the other adjacent flap.

6. An axisymmetric nozzle as in claim 5, further comprising:
   said divergent flaps each having a cooling air ejector slot therethrough;
   cavity seals sealingly extending from said static member to said divergent flaps at a location aft of said ejector slots; and
   supply means for introducing cooling air between said cavity seals and said divergent flaps.

7. An axisymmetric nozzle as in claim 6, further comprising said external flaps each slidingly secured to said divergent flap by a slot and pin connection comprising:
   a slot in a member secured said divergent flap with said slot parallel to said divergent flap;
   and a pin passing through said slot and secured to said external flap.

8. An axisymmetric nozzle as in claim 2, wherein:
   the arms of said adjacent flaps are parallel when the maximum overlap occurs.

9. An axisymmetric nozzle as in claim 2, further comprising:
   said divergent flaps each having a cooling air ejector slot therethrough;
   cavity seals sealingly extending from said static member to said divergent flaps at a location aft of said ejector slots; and
   supply means for introducing cooling air between said cavity seals and said divergent flaps.

10. An axisymmetric nozzle as in claim 2, wherein:
    the longitudinally extending center of each of said "V" said shaped external flaps comprises a peak; and
    said peak extends aft of the remainder of said external flap and aft of the aft end of said divergent flap.

11. An axisymmetric nozzle as in claim 2, further comprising:
    one arm of each external flap overlapping outboard of the adjacent flap and one arm overlapping inboard of the other adjacent flap.

12. An axisymmetric nozzle as in claim 1, further comprising said external flaps each slidingly secured to said divergent flap by a slot and pin connection comprising:
    a slot in a member secured said divergent flap with said slot parallel to said divergent flap;
    and a pin passing through said slot and secured to said external flap.

13. An axisymmetric convergent/divergent nozzle for a gas turbine engine comprising:
    a static structure for the conveyance of exhaust gas therethrough;
    a plurality of N convergent flaps circumferentially disposed adjacent one another, aft of said static structure and pivotally secured to said static structure;
    a plurality of N divergent flaps, each secured at the forward end to the aft end of a convergent flap;
    adjustment means for adjusting position of said divergent flaps; and
    a plurality of N/3 exterior flaps in overlapping relationship with adjacent exterior flaps, and located outboard of said divergent flaps, each pivotally secured at the forward end of the said static structure and slidably secured to a divergent flap at the aft end.

14. An axisymmetric nozzle as in claim 13, wherein:
    each exterior flap has a cross section of substantially a "V" shape with two linear arms, the arms of adjacent flaps overlapping.

15. An axisymmetric nozzle as in claim 14, further comprising:
    the forward end of each external flap arcuate in cross section with no linear arms.

16. An axisymmetric nozzle as in claim 15, wherein:
    the longitudinally extending center of each of said "V" shaped external flaps comprises a peak; and said peak extends aft of the remainder of said external flap and aft of the aft end of said divergent flap.

17. An axisymmetric nozzle as in claim 16, further comprising:
one arm of each external divergent flap overlapping outboard of the adjacent flap and one arm overlapping inboard of the other adjacent flap.

18. An axisymmetric nozzle as in claim 17, further comprising:
said divergent flaps each having a cooling air ejector slot therethrough;
cavity seals sealingly extending from said static member to said divergent flaps at a location aft of said ejector slots; and supply means for introducing cooling air between said cavity seals and said divergent flaps.

19. An axisymmetric nozzle as in claim 18, further comprising said external flaps each slidingly secured to said divergent flap by a slot and pin connection comprising:
a slot in a member secured said divergent flap with said slot parallel to said divergent flap; and
a pin passing through said slot and secured to said external flap.

20. An axisymmetric nozzle as in claim 19, wherein: $N=15$.

21. An axisymmetric nozzle as in claim 18, wherein: $N=15$.

22. An axisymmetric nozzle as in claim 16, wherein: $N=15$.

23. An axisymmetric nozzle as in claim 14, wherein: the arms of said adjacent flaps are parallel when the maximum overlap occurs.

24. An axisymmetric nozzle as in claim 14, further comprising:
said divergent flaps each having a cooling air ejector slot therethrough;
cavity seals sealingly extending from said static member to said divergent flaps at a location aft of said ejector slots; and supply means for introducing cooling air between said cavity seals and said divergent flaps.

25. An axisymmetric nozzle as in claim 24, wherein: $N=15$.

26. An axisymmetric nozzle as in claim 14, wherein:
the longitudinally extending center of each of said "V" shaped external flaps comprises a peak; and
said peak extends aft of the remainder of said external flap and aft of the aft end of said divergent flap.

27. An axisymmetric nozzle as in claim 14, further comprising:
one arm of each external flap overlapping outboard of the adjacent flap and one arm overlapping inboard of the other adjacent flap.

28. An axisymmetric nozzle as in claim 13, further comprising said external flaps each slidingly secured to said divergent flap by a slot and pin connection comprising:
a slot in a member secured said divergent flap with said slot parallel to said divergent flap; and
a pin passing through said slot and secured to said external flap.

29. An axisymmetric nozzle as in claim 13, wherein: $N=15$.

* * * * *